(12) United States Patent
Haridass et al.

(10) Patent No.: US 7,818,599 B2
(45) Date of Patent: Oct. 19, 2010

(54) STATISTICAL SWITCHED CAPACITOR DROOP SENSOR FOR APPLICATION IN POWER DISTRIBUTION NOISE MITIGATION

(75) Inventors: Anand Haridass, Austin, TX (US); Colm B. O'Reilly, Austin, TX (US); Roger D. Weekly, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 11/869,186

(22) Filed: Oct. 9, 2007

(65) Prior Publication Data
US 2009/0091378 A1   Apr. 9, 2009

(51) Int. Cl.
*G06F 1/26* (2006.01)
(52) U.S. Cl. .................. 713/340; 713/300; 702/64; 702/199
(58) Field of Classification Search .......... 713/300, 713/310, 340; 702/64, 191, 193, 194, 199
See application file for complete search history.

(56) References Cited

U.S. PATENT DOCUMENTS

| | | | |
|---|---|---|---|
| 4,810,101 A * | 3/1989 | Kage et al. | ............ 375/328 |
| 5,606,511 A * | 2/1997 | Yach | ............ 702/64 |
| 5,894,423 A | 4/1999 | Ling et al. | |
| 6,191,647 B1 | 2/2001 | Tanaka et al. | |
| 6,219,723 B1 | 4/2001 | Hetherington et al. | |
| 6,472,856 B2 | 10/2002 | Groom et al. | |
| 6,538,497 B2 | 3/2003 | Thomas et al. | |
| 6,636,976 B1 | 10/2003 | Grochowski et al. | |
| 6,675,301 B1 | 1/2004 | Kurosawa et al. | |
| 6,721,903 B2 | 4/2004 | Yoshioka et al. | |
| 6,799,070 B2 | 9/2004 | Wolfe et al. | |
| 6,819,538 B2 | 11/2004 | Blaauw et al. | |
| 6,922,111 B2 | 7/2005 | Kurd et al. | |
| 6,934,865 B2 | 8/2005 | Moritz et al. | |
| 6,978,388 B1 | 12/2005 | Cornelius | |
| 7,000,122 B2 | 2/2006 | Zafarana et al. | |
| 7,035,785 B2 | 4/2006 | Grochowski et al. | |
| 7,071,723 B2 | 7/2006 | Krishnamoorthy et al. | |
| 7,134,036 B1 | 11/2006 | Guan | |
| 7,233,163 B2 | 6/2007 | Krishnamoorthy et al. | |
| 7,236,920 B2 | 6/2007 | Grochowski et al. | |
| 7,239,494 B2 | 7/2007 | Naffziger | |
| 7,339,411 B2 | 3/2008 | Yuuki et al. | |

(Continued)

OTHER PUBLICATIONS

USPTO Notice of allowance for U.S. Appl. No. 11/847,557 dated Dec. 31, 2009.

(Continued)

*Primary Examiner*—Dennis M Butler
(74) *Attorney, Agent, or Firm*—Yee & Associates, P.C.; Matthew W. Baca

(57) ABSTRACT

A circuit and a method for detecting noise events in a system with time variable operating points is provided. A switched capacitor filter comprising a plurality of capacitor units, samples a first voltage to determine an average of a set of voltage measurements, forming an average voltage. A filter control unit controls the plurality of capacitor units in the switched capacitor filter. A comparing unit compares the average voltage to the first voltage to form a comparison. A signaling unit generates a signal to instruct circuits in a processor to initiate actions to keep the first voltage from drooping below a threshold level in response to the comparison.

25 Claims, 6 Drawing Sheets

U.S. PATENT DOCUMENTS

| | | |
|---|---|---|
| 7,467,050 B2 | 12/2008 | Douriet et al. |
| 7,480,810 B2 | 1/2009 | Gonzalez et al. |
| 7,483,248 B1 | 1/2009 | Ho et al. |
| 2004/0085085 A1 | 5/2004 | Muhtaroglu et al. |
| 2004/0123166 A1* | 6/2004 | Gauthier et al. ............ 713/300 |
| 2005/0062507 A1 | 3/2005 | Naffziger et al. |
| 2006/0132086 A1 | 6/2006 | Altenburg et al. |
| 2007/0006012 A1 | 1/2007 | Mosur et al. |
| 2007/0283172 A1 | 12/2007 | Douriet et al. |
| 2007/0296391 A1* | 12/2007 | Bertin et al. ............... 323/303 |
| 2008/0007272 A1 | 1/2008 | Ferraiolo et al. |
| 2008/0082887 A1 | 4/2008 | Dhong et al. |
| 2009/0048794 A1 | 2/2009 | Douriet et al. |
| 2009/0063065 A1 | 3/2009 | Weekly |
| 2009/0063884 A1 | 3/2009 | Weekly |

OTHER PUBLICATIONS

U.S. Appl. No. 11/420,820, filed May 30, 2006, Douriet.
U.S. Appl. No. 11/420,825, filed May 30, 2006, Douriet.
U.S. Appl. No. 11/847,820, filed Aug. 30, 2007, Weekly.
U.S. Appl. No. 11/848,830, filed Aug. 31, 2007, Weekly.
USPTO Office Action dated Aug. 20, 2009 for U.S. Appl. No. 11/847,557.

* cited by examiner

STATISTICAL SWITCHED CAPACITOR DROOP SENSOR FOR APPLICATION IN POWER DISTRIBUTION NOISE MITIGATION

BACKGROUND OF THE INVENTION

1. Field of the Invention

The present invention relates generally to an apparatus and method for controlling power supply and power distribution system noise. More specifically, the present invention provides a method and apparatus for detecting noise events in a system with time variable operating points.

2. Description of the Related Art

Power supply and power distribution system noise, especially dips due to large step activity increases in a microprocessor, are a limiting factor in how fast the circuits in such a processor can operate. This either limits the system operating frequency or limits chips that can yield at any given objective frequency. Traditionally, decoupling capacitors have been used to limit the magnitude of this noise. However, as design frequencies have risen over the years, decoupling capacitance is becoming either less effective at the frequencies that are required to have an effect, or are too costly in financial terms or power dissipation terms. That is, in terms of chip real estate and oxide leakage impact on chip power requirements.

Electrical distance from capacitor placement sites to circuits on chips constrained by physical space availability can make discrete capacitors completely or nearly ineffective. Therefore, it would be useful to have a mechanism for detecting noise events that indicate that further executions will cause the voltage in a circuit to dip to unacceptably low levels.

Current solutions may utilize a circuit with a precision direct current (DC) reference to determine if the noise being detected is of a sufficient magnitude to cause action to be taken. However, use of a fixed DC reference will not allow distinguishing between high frequency noise and other drift, set-point granularity, voltage drops due to current and power distribution resistance, and other low frequency and DC variances from the perfect reference. Drift is a low frequency fluctuation. Set-point granularity means that there are only finite discrete points that can be generated. Points between these finite points are off limits and cannot be generated. Therefore, it would be desirable to determine a way to address these issues in a cost effective manner by using the voltage being monitored as the reference.

SUMMARY OF THE INVENTION

Exemplary embodiments provide a circuit and a method for detecting noise events in a system with time variable operating points. A switched capacitor filter comprising a plurality of capacitor units, samples a first voltage to determine an average of a set of voltage measurements, forming an average voltage. A filter control unit controls the plurality of capacitor units in the switched capacitor filter. A comparing unit compares the average voltage to the first voltage to form a comparison. A signaling unit generates a signal to instruct circuits in a processor to initiate actions to keep the first voltage from drooping below a threshold level in response to the comparison.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
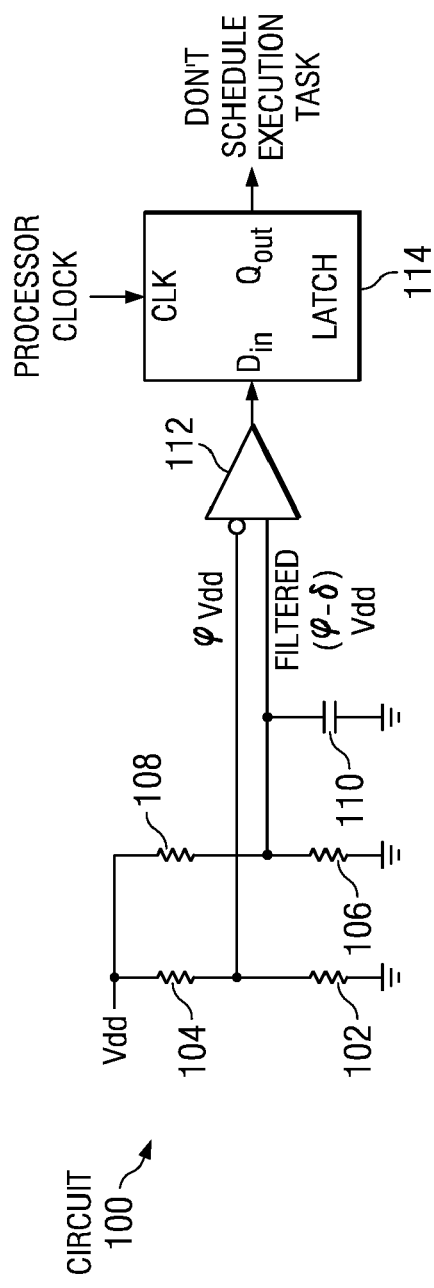
FIG. 1 is a known circuit diagram for a sensing mechanism.

FIG. 1 is a known circuit diagram for a sensing mechanism. Circuit 100 comprises resistors 102, 104, 106, and 108, capacitor 110, comparator 112, and latch 114. A comparator is a device, which compares two voltages or currents, and switches the output produced to indicate which is larger. Resistors 102 and 104 comprise a resistor divider network that presents a first fraction of the Vdd voltage to the inverting input of the comparator 112. Vdd stands for the voltage supplied to the circuit. This first fraction is represented by the term $\phi$. $\phi$ is representative of a value between 0 and 1. $\phi$ is chosen to assure that the voltage presented to the inverting input of comparator 112 is within the operational range of comparator 112.

Resistors 106 and 108 comprise a second resistor divider network that presents a second fraction for the Vdd voltage to the non-inverting input of the comparator 112. This voltage is filtered by capacitor 110 so that the voltage at the non-inverting input of the comparator 112 is averaged over the time period determined by the values of resistors 106 and 108 and capacitor 110. The second fraction is slightly less than the first fraction. The second fraction is represented by the term $(\phi-\delta)$. $\delta$ is representative of a value between 0 and that represented by first fraction $\phi$. $\delta$ divided by $\phi$ represents the fraction of the average voltage on Vdd, which should the noise droop below that average voltage on Vdd, then initiation of instruction executions will be stalled. Latch 114 is comprised of $D_{in}$, where the comparator inputs to the latch; $Q_{out}$, which sends the output signal to prevent scheduling of an execution task; and a processor clock input. The unfiltered Vdd containing noise, $\phi$Vdd, is compared to the filtered Vdd, $(\phi-\delta)$Vdd, by comparator 112. If $\phi$Vdd is lower than $(\phi-\delta)$Vdd, then comparator 112 sends a signal to latch 114, and latch 114 sends the message to disallow the scheduling of a subsequent execution task.

Exemplary embodiments utilize switched capacitor technology in a novel manner in order to obtain very accurate criteria for averaging period and droop threshold level without requiring any calibration processes to mitigate process tolerances on the circuit elements. Exemplary embodiments do not impose any variations in normal integrated circuit manufacturing processes.

A traditional switched capacitor unit first charges a capacitor of value C to voltage $V_{in}$ within a given sequence of events. This sequence of events is repeated at a sampling frequency F. The capacitor C is charged rapidly with respect to the period of the sampling frequency. During the time period that the capacitor C is not being charged to the input voltage $V_{in}$, the input voltage $V_{in}$ is shorted to another capacitor C'. For this well known circuit, the voltage across C' is related to the input voltage as $V_c = V_i e^{-t/\tau}$ where the time constant $\tau = C'/(Cf)$. This can also be expressed as a −3 dB Bandwidth of $1/(2\pi\tau)$, or $Cf/(2\pi C')$. In a traditional switched capacitor filter, the capacitor C along with the switches to transfer charge into and out of it at a frequency F act equivalent to a resistor of value $1/(Cf)$.

The input signal sampling is done so that the average of the unit capacitor to total capacitance along with the sampling rate of that input signal sets both the bandwidth of the filter as well as the low frequency attenuation of the filter. Thus, the tolerances of the capacitors that make up the switched capacitor circuits do not affect the accuracy of the bandwidth and the low frequency attenuation parameters, as would use of a passive RC filter, resistive voltage divider, or simple switched capacitor filter.

FIGS. 2 to 10 assume Vdd is positive and the transistors are n-channel FET transistors. However, those skilled in the art will realize that all the concepts in FIGS. 1-10 work with p-channel transistors or pass gates as well.

Figure 2:
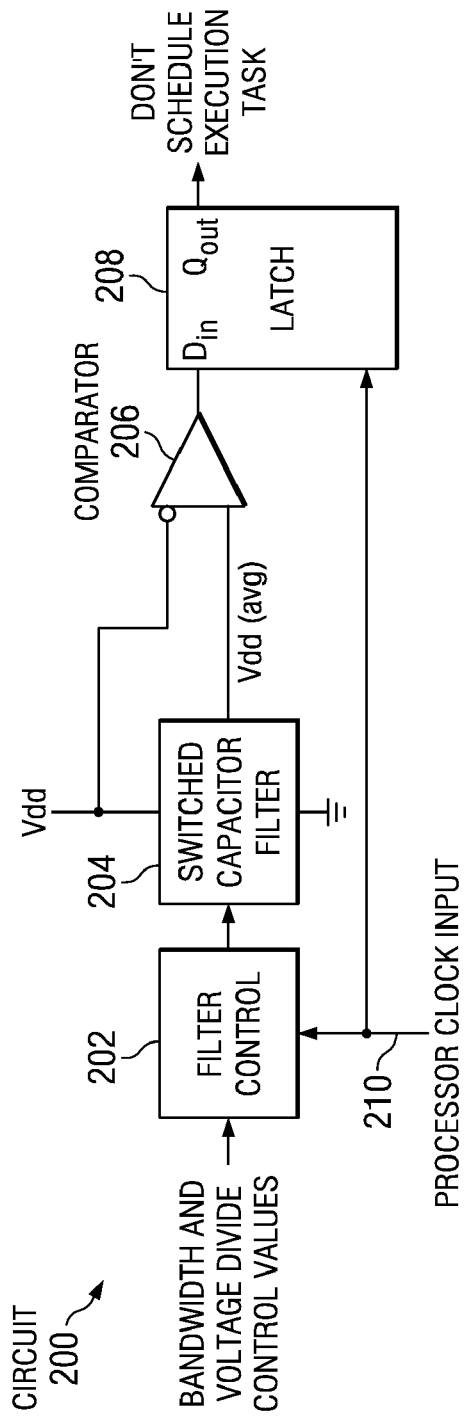
FIG. 2 is a block diagram of a circuit diagram for a sensing mechanism, in accordance with an exemplary embodiment.

FIG. 2 is a block diagram of a circuit diagram for a sensing mechanism, in accordance with an exemplary embodiment. Circuit 200 is similar to circuit 100 of FIG. 1 except that in circuit 200, filter control 202 and switched capacitor filter 204 replace the passive components of resistors 102, 104, 106, and 108, and capacitor 110 of FIG. 1. Circuit 200 comprises filter control 202, switched capacitor filter 204, comparator 206, latch 208, and processor clock input 210. Comparator 206 has a common mode comparison range close to the Vdd voltage that is sensed. In contrast, comparator 112 of FIG. 1 has resistive dividers to lower the common mode input voltages.

Latch 208 is comprised of $D_{in}$, where the comparator inputs to the latch; $Q_{out}$, which sends the output signal to prevent scheduling of an execution task; and processor clock input 210. The unfiltered input voltage containing noise, Vdd, is compared to the attenuated and filtered average filtered Vdd(avg), by comparator 206. The attenuated and filtered Vdd(avg) is decreased by switched capacitor filter 204 such that it is on average some set fraction less in voltage than Vdd. If Vdd is lower than Vdd(avg), then comparator 206 sends a signal to latch 208, and latch 208 sends the message to disallow the scheduling of a subsequent execution task.

In another exemplary embodiment, comparator 206 sends a signal to latch 208, and latch 208 sends a signal to other circuits in the processor to initiate actions to keep the voltage from drooping below a threshold level if Vdd is lower than Vdd(avg) by a specified criteria. In another exemplary embodiment, comparator 206 sends a signal to latch 208, and latch 208 sends a signal to other circuits in the processor to initiate actions to keep the voltage from drooping below a threshold level if Vdd is higher than Vdd(avg) by a specified criteria. The specific criteria will vary with the particular implementation. However, some examples of specific criteria may be if the voltage is higher or lower than a specific amount, or range, or if the voltage exceeds a certain range. Another example would be if the Vdd were either higher or lower than the Vdd(avg) by a specific percentage of the Vdd(avg).

Figure 3:
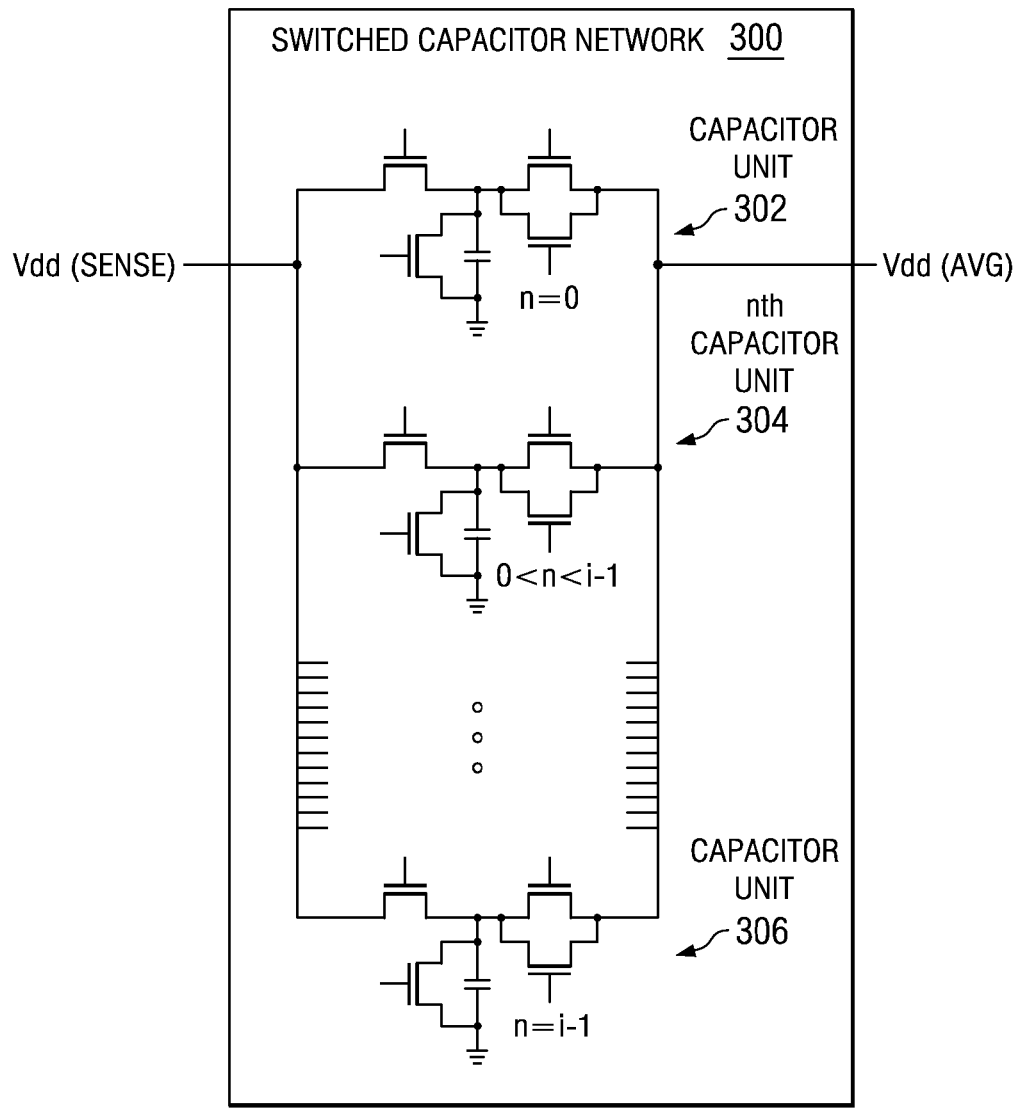
FIG. 3 is a block diagram of a switched capacitor network in accordance with exemplary embodiment.

FIG. 3 is a block diagram of a switched capacitor network in accordance with an exemplary embodiment. Switched capacitor network 300 may be implemented as switched capacitor filter 204 in FIG. 2. In an exemplary embodiment switched capacitor network 300 has thirty-two (32) identical switched capacitor units. However, in alternate embodiments, switched capacitor network 300 comprises any statistically significant number of identical switched capacitor units, as represented by "i" in the figure. Each capacitor unit, such as capacitor units 302 and 306 and $n^{th}$ capacitor unit 304, comprises four (4) transistors and a capacitor. These transistors are used to transfer charge into and out of each capacitor unit. Nth capacitor unit 304 represents any capacitor unit that occurs between capacitor units 302 and 306, which are the first and last capacitor units in switched capacitor network 300.

Figure 4:
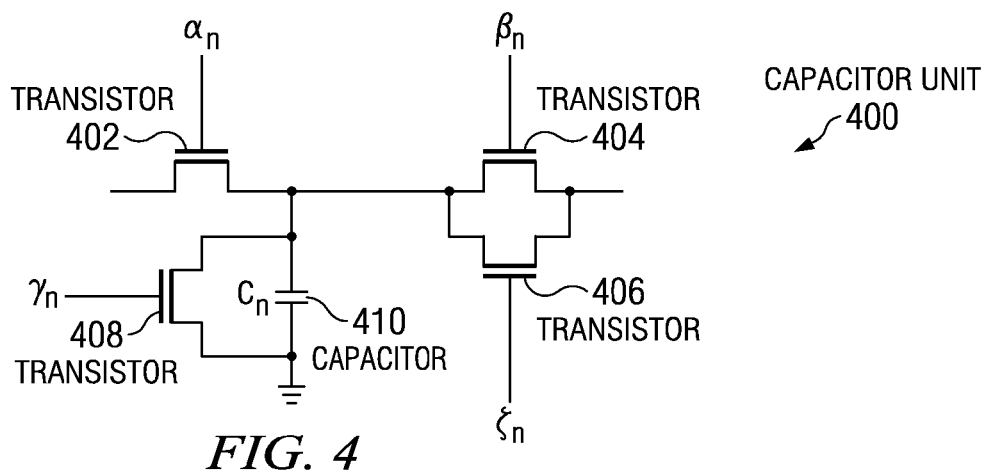
FIG. 4 is a block diagram of a capacitor unit of a switched capacitor in accordance with exemplary embodiment.

FIG. 4 is a block diagram of a capacitor unit of a switched capacitor in accordance with an exemplary embodiment. Capacitor unit 400 is an example of an $n^{th}$ capacitor unit in a switched capacitor, such as $n^{th}$ capacitor unit 304 of switched capacitor network 300 in FIG. 3. Capacitor unit 400 comprises four (4) transistors, transistors 402, 404, 406, and 408, and capacitor 410. Each of the four (4) transistors, transistors 402, 404, 406, and 408 associated with capacitor unit 400 are independently controlled by the signals $\alpha_n$, $\beta_n$, $\zeta_n$, and $\gamma_n$. It will be understood by those skilled in the art that the transistors act as switches that can be implemented as transfer gates or other like circuit elements.

The α control signal, sometimes referred to simply as an α signal or α, is a charging control signal. That is, the α signal controls sampling or charging of the capacitor units. The γ control signal, sometimes referred to simply as a γ signal or γ, is a discharging control signal. The β control signal, sometimes referred to simply as a β signal or β, is a strong switch charge averaging control signal. The ζ control signal, sometimes referred to simply as a ζ signal or ζ, is a weak switch charge averaging control signal.

Figure 5:
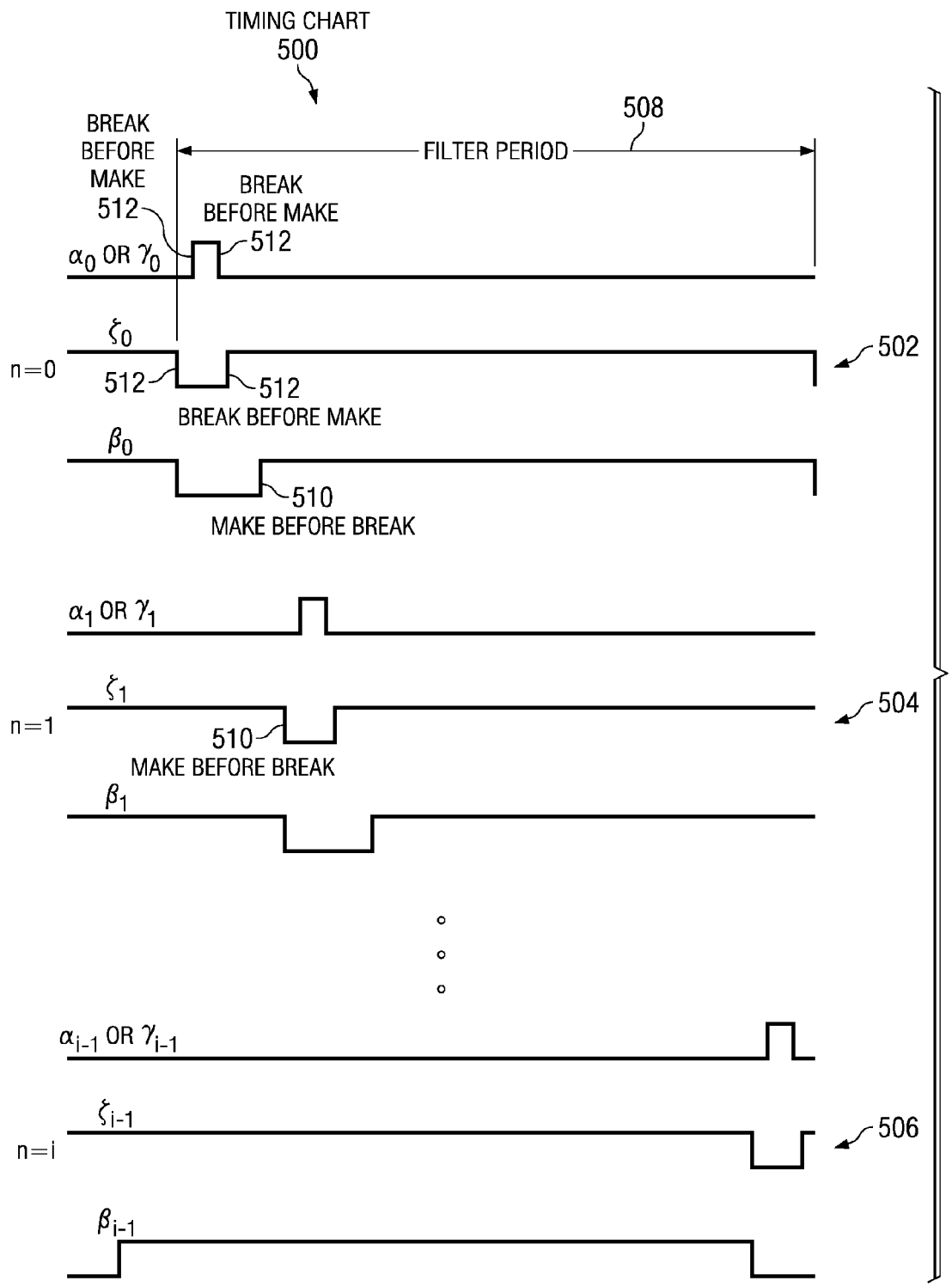
FIG. 5 illustrates the timing relationship between the $\alpha$, $\beta$, and $\zeta$ signals of a capacitor unit in accordance with an exemplary embodiment.

FIG. 5 illustrates the timing relationship between the α, β, and ζ signals of a capacitor unit, such as capacitor unit 302 in FIG. 3, in accordance with an exemplary embodiment. The α, β, and ζ signals are inputs to switched capacitor filter 204 from the outputs of the filter control 202 in FIG. 2. Break before make means that the transistors that are being turned off complete turning off before the transistors that are being turned on begin being turned on. Make before break means that the transistors that are being turned on complete turning on before the transistors that are being turned off begin being turned off.

In timing chart 500, time is the horizontal axis. Timing chart 500 comprises chart segments 502, 504 and 506. Filter period 508 is the filter period. Chart segment 502 represents the timing relationship of a capacitor unit n=0. Chart segment 504 represents the timing relationship of a capacitor unit n=1. Chart segment 506 represents the timing relationship of a capacitor unit n=i−1. Make before break 510 illustrates that the $\beta_0$ transistor of the $(n-1=0)^{th}$ capacitor unit turns on before the $\zeta_1$ and $\beta_1$ transistor of the $(n=1)^{th}$ capacitor unit turns off. Break before make 512 illustrates that the $\zeta_0$ and $\beta_0$ transistor of the $(n=0)^{th}$ capacitor unit turns off before the $\alpha_0$ or $\gamma_0$ transistor of that capacitor unit turns on. Break before make 512 also illustrates that the $\alpha_0$ or $\gamma_0$ transistor of the $(n=0)^{th}$ capacitor unit turns off before the $\zeta_0$ transistor of that capacitor unit turns on.

Timing chart 500 assumes that signal γ was not activated. Thus, switched capacitor network 300 in FIG. 3 acts as a low pass filter with a bandwidth in radians per second at the frequency that any $\alpha_n$ is activated divided by i−1, which is the total number of capacitor units tied together with their $\beta_n$s active. Like all switch capacitor circuits, the transistor or pass gate must be strong enough so that the capacitor is fully charged in a unit cell to a final value within the time that $\alpha$ is active. A pass gate is two transistors, a p-transistor and an n-transistor, connected in parallel with their gates driven in opposite polarities such that both transistors are either conducting (on) or are non-conducting (off). The advantage of a pass gate over a single transistor switch is that a pass gate common mode operating range spans 100% of the supply voltage range.

The larger and stronger that the transistor or pass gate is the more undesired noise that the transistor or pass gate induces on the filtered output voltage. A physically larger gate and channel, which are parts of the transistor, result in large transistor gate capacitance relative to the capacitor C capacitance. Weaker transistors will have higher resistance when switched on than stronger ones. The transistor or pass gate associated with $\zeta$ is weaker than the one associated with $\beta$ so that the noise introduced on the Vdd(avg) node is minimized. Thus, $\zeta$ is referred to as a weak switch charge averaging control signal while $\beta$ is referred to as a strong switch charge averaging control signal.

Because all $\beta$s are active except the nth one when $\alpha_n$ is activated, all capacitors not involved in sampling the input voltage are involved in storing an accumulated charge. The equation of the capacitance times the sampled voltage minus the average voltage, expressed as C*(Vsampled−Vavg), is the charge delivered to i minus one times capacitance capacitors, expressed as (i−1)*C capacitors, each period at a frequency, F.

Therefore, since the charge can also be represented by the ratio of the average current to the frequency, expressed as Iavg/F, then, by rearranging the variables, the expression Iavg/F=C(dV) or dV/Iavg=1/(C*F) is arrived at. In other words, the average current divided by the sampling, or charge transfer frequency, is equal to the capacitance of the capacitor divided by the voltage change when charging the capacitor. Rearranging variables, the voltage change divided by the average current is equal to the reciprocal of capacitance times the charge transfer or sampling frequency.

Thus a capacitor unit controlled by the $\alpha$, $\beta$, $\gamma$, and $\zeta$ control signals as shown in FIG. 4 looks like a resistance of one divided by capacitance times frequency, expressed as 1/(C*F). The switched capacitor has a single pole response with a −3 dB Bandwidth equal to the sampling frequency divided by the product of $2\pi$ times the quantity i minus 1, which is expressed as F/$2\pi$(i−1). Single pole response is a term categorizing a filter as having a response characteristic consistent with that having a single passive element such as a resistor and a single reactive element such as a capacitor or inductor. For these filters, the response is flat in the passband, rolls off at 20 dB per decade of frequency in the stopband, and has −3 dB of attenuation relative to the passband maximum at the −3 dB Bandwidth frequency. While this presents an improved bandwidth accuracy as compared to the use of a resistor with the capacitor, exemplary embodiments provide for an improved bandwidth accuracy.

By sequencing through all i capacitor units, exemplary embodiments significantly reduce the tolerance effects of the capacitor units. The average capacitance of all i capacitors is Cavg, and the deviation from this average capacitance for the nth unit is Cdelta$_n$. Then the filter's single pole response −3 dB Bandwidth may be expressed as the multiplicative inverse of $2\pi$ times the ratio of the sampling frequency multiplied by the quantity of the average capacitance plus the deviation from the average capacitance to the number of unit capacitors multiplied by the average capacitance minus the average capacitance minus the deviation from the average capacitance, F*(Cavg+Cdelta$_n$)/$2\pi$(i*Cavg−Cavg−Cdelta$_n$). Assuming that Cdelta$_n$ is small compared to (i−1)*Cavg, then the −3 dB Bandwidth is approximately $\{F/2\pi(i-1)\}$*(1+Cdeltan/Cavg). In other words, the tolerance of the switched capacitor filter's −3 dB Bandwidth is the same as that of the unit capacitor. Tolerance is the fraction of variance in the expected performance or value relative to the design nominal performance or value.

Exemplary embodiments provide that each of the unit capacitors are used to do the sampling such that each unit capacitor is used over i sample periods, then the tolerance contribution from each unit capacitor would be an $i^{th}$ of the tolerance of the unit capacitor, and the sum of i of these tolerance contributions would be zero (0). This is because the definition of average is that the sum of all the contributing variations from the average is zero (0). In other words, the average $a_{avg}=(a_0+a_1+\ldots+a_n+\ldots+a_i)/i$, if $a_0=a_{avg}+a_{deleta\_0}$ $a_1=a_{avg}+a_{deleta\_1}$ $a_n=a_{avg}+a_{delta\_n\_1}$; and $a_i=a_{avg}+a_{delta\_i}$ then $a_{avg}=(\Sigma_{n=0}\ldots{}_i a_n)/i$, or $a_{avg}=(i*a_{avg}+\Sigma_{n=0}\ldots{}_i a_{delta\_n})/i$, then $0=\Sigma_{n=0}\ldots{}_i a_{delta\_n}$.

Exemplary embodiments provide a circuit that uses all unit capacitors in a switched capacitor network equally to sample the input voltage. Thus, the bandwidth tolerance is dominated by the frequency tolerance. The collection of capacitor unit 400 of FIG. 4 into a network as illustrated in FIG. 3 and controlled by the timing illustrated in FIG. 5 by the filter control 202 of FIG. 2, defined by the state machines and logic diagram in FIGS. 6, 7, 8 & 9 acts as a single pole filter. A classical single pole switched capacitor filter only involves capacitors C and C' with only a couple of transistor switches. This simple implementation suffers large tolerance sensitivities to process variations of the resulting filter bandwidth to the capacitance tolerances. Exemplary embodiments overcome these limitations. A very small contributor from the denominator term of Cdelta$_n$ in the equation F*(Cavg+Cdelta$_n$)/$2\pi$(i*Cavg−Cavg−Cdelta$_n$), which is ignored in the above analysis as the frequency tolerance is much less than the capacitor tolerance divided by i.

Since in this configuration, exemplary embodiments are sampling i samples per the frequency of activating $\alpha_n$, then the single pole −3 dB Bandwidth of the filter is F*i/$2\pi$(i−1). Therefore, for example, assume a processor clock frequency of 4.6 GHz, and a low pass filter with a three decibel (3 dB) bandwidth of four hundred and ninety kilo-hertz (490 KHz) for voltage averaging is required. If there are 32 capacitor units (i) then an $\alpha_n$ signal would have to be activated every 1536 clock cycles. This means that $\alpha_{n+1}$ would be activated 48 clock cycles after $\alpha_n$ was activated.

The $\gamma$ control allows the filter's low frequency attenuation to be adjusted. This low frequency attenuation is the gain of the filter at low frequency as the frequency asymptotically approaches DC. For purposes of the present exemplary embodiments, the low frequency attenuation will always be less than one. Adjusting the filter's low frequency attenuation is required in the voltage droop sensing mechanism so that a noise droop threshold can be implemented in the sensing mechanism. In an exemplary embodiment, a function of the filter control would determine when the activation of any $\alpha_n$ should instead activate a $\gamma_n$. A ratio of the number of $\alpha$ to the number of $\alpha+\gamma$ activations determines the low frequency transfer function of the filter. $\alpha$ and $\gamma$ are never active at the same time (see timing chart 500 in FIG. 5). In exemplary embodiments every so many times that an $\alpha$ is activated, a $\gamma$ activation is substituted instead. The number of times $\alpha$ is activated to turn on transistor 402 of FIG. 4 for any capacitor unit in switched capacitor network 300 of FIG. 3 between times that $\gamma$ is activated instead to turn on transistor 408 of FIG. 4 for any capacitor unit in switched capacitor network 300 of FIG. 3 is the ratio being discussed. This ratio is multiplied times the Vdd(sense) to get the low frequency attenuated value of Vdd(avg). A low frequency transfer function is gain expressed as a function of frequency and attenuation is gain that is less than one.

In order that the low frequency attenuation is not affected by capacitance tolerances, the repetition rate of $\alpha/\gamma$ must be chosen so that the rate does not share prime number factors with i. By making sure this repetition rate is not divisible by the number of capacitor units i, then any one single particular capacitor unit will not always be involved in the $\gamma$ activation. By cycling through capacitor units that are involved in the $\gamma$ activation, the capacitor tolerances will average out. This is easy to accomplish if either i or $\alpha/\gamma$ is set as a power of two (2) and the other is set as an odd number. In an exemplary embodiment i is chosen to be the statistically significant value of thirty-two (32), which is a power of two (2), and $\alpha/\gamma$ is chosen to be twenty-five (25). This sets the low frequency transfer function at $25/26$ths of the Vdd with a very small tolerance.

Figure 6:
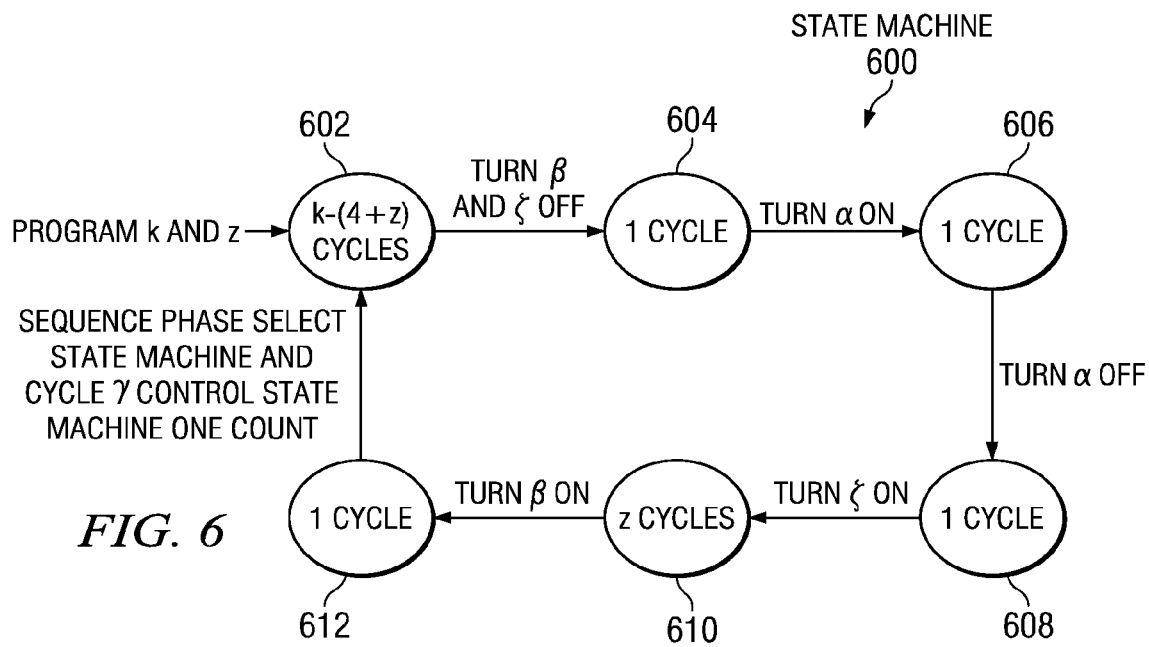
FIG. 6 is a block diagram of a master filter control state machine in accordance with a preferred embodiment.
Figure 7:
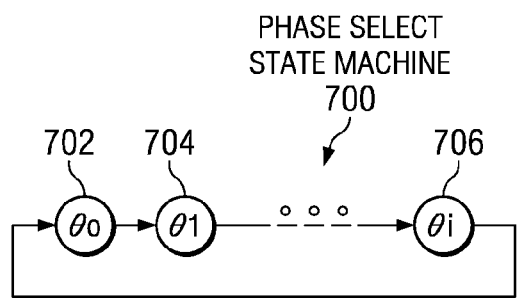
FIG. 7 is a block diagram of a phase select state machine in accordance with an exemplary embodiment.
Figure 8:
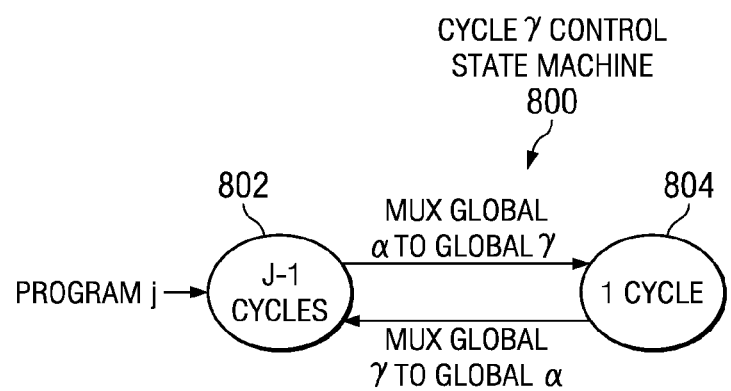
FIG. 8 is a block diagram of a cycle $\gamma$ control state machine according to an exemplary embodiment.

FIGS. 6, 7, and 8 illustrate three (3) different state machines that define the filter control block 202 of FIG. 2. A state machine is a controller that sequences through states, or sets of assignments to parameters, and/or outputs in response to inputs that can include clocks.

FIG. 6 is a block diagram of a master filter control state machine in accordance with a preferred embodiment. State machine 600 determines the sample rate of a switched capacitor filter, such as switched capacitor filter 204 in FIG. 2, by creating a global $\alpha$ and $\beta$ as well as an output indicating when the other state machines that make up the filter control should either cycle or begin cycling through their states.

State machine 600 is initially configured by programming the parameter 'k' to control the time delays between activation of the $\alpha$, $\beta$, $\gamma$, and $\zeta$ control signals to one nth capacitor unit 304 of FIG. 3 to the next, as shown in timing chart 500 of FIG. 5. State machine 600 is also initially configured by programming the parameter 'z' to control the delay between activating $\zeta$ and $\beta$. Parameter 'z' is set to assure that the weak transistor 406 of FIG. 4 controlled by $\zeta_n$ is on long enough so that all capacitors are at nearly the same voltage before turning on the strong transistor 404 of FIG. 4 controlled by $\beta_n$. This will limit noise during that time that charge is being transferred between capacitors. These parameters may be hardwired into the state machine or programmed. The processor clock input 210 of FIG. 2 sequences the state machine 600 through its states, after the number of cycles as indicated within each state bubble of that processor clock input 210 of FIG. 2, have elapsed. The transitions between states are indicted by the arrows with output actions of the state machine indicated at each transition.

For example, the state machine transitions between states 602 and 604 at some processor clock input 210 of FIG. 2 cycle where it sets both $\beta$ and $\zeta$ inactive. A cycle later, it makes $\alpha$ active, state 606. Another cycle later, it makes $\alpha$ inactive again, state 608. A cycle after that, it makes $\zeta$ active, state 610. The state machine will stay in state 610 until a number 'z' further cycles have elapsed, then it will make $\beta$ active again, state 612. The next cycle after that, it will indicate to the phase select state machine 700 of FIG. 7 and cycle $\gamma$ control state machine 800 of FIG. 8 to cycle. Finally, it will do nothing more until time to repeat the sequence for the next capacitor unit. The phase select state machine will have cycled to the next n to direct these control signals to the next capacitor unit.

FIG. 7 is a block diagram of a phase select state machine in accordance with an exemplary embodiment. Phase select state machine 700 indicates which nth unit capacitor of the switched capacitor network 300 in FIG. 3, should have their $\alpha$ and $\beta$ inputs switched during the sampling period. For each unit capacitor in the switched capacitor filter, $\alpha$ and $\beta$ are multiplexed to the proper phase as indicated by phase select state machine 700 and the subscript to $\theta$. The default disposition of the $\alpha_n$ and $\beta_n$ controls to unit capacitor n are $\alpha_n$ off and $\beta_n$ on, unless phase select state machine 700 is in a state indicating n as indicated by the subscript to $\theta$. At state 702, phase select state machine 700 indicates that unit capacitor zero (0) should have $\alpha_0$ and $\beta_0$ reflect the $\alpha$ and $\beta$ values from state machine 600 of FIG. 6 when in this state.

Phase select state machine 700 is then sequenced forward by a master filter control state machine as reflected in the state transition from cycle 612 to cycle 602 of state machine 600 of FIG. 6 to state 704. State 704 indicates that unit capacitor one (1) should have $\alpha_0$ and $\beta_0$ reflect the $\alpha$ and $\beta$ values from state machine 600 of FIG. 6 when in this state. Thus, the $\alpha_n$ and $\beta_n$ for unit capacitor zero (0) and all other unit capacitors other than one (1) are set to the default disposition of $\alpha_n$ off and $\beta_n$ on.

Eventually phase select state machine 700 is sequenced by the master filter control state machine to state 706. State 706 indicates that that unit capacitor i should have $\alpha_i$ and $\beta_i$ reflect the $\alpha$ and $\beta$ values from state machine 600 of FIG. 6 when in this state. Thus, the $\alpha_n$ and $\beta_n$ for unit capacitors other than i are set to the default disposition of $\alpha_n$ off and $\beta_n$ on. The process continues cycling through the number of i states.

FIG. 8 is a block diagram of a cycle $\gamma$ control state machine according to an exemplary embodiment. A cycle $\gamma$ control state machine is a cycle discharging control signal state machine. Cycle $\gamma$ control state machine 800 indicates if a $\gamma$ signal rather than an $\alpha$ signal should be activated when a master filter control state machine activates a global $\alpha$ signal. The parameter j is programmed to control the low frequency attenuation of the switched capacitor filter. The filter output will be scaled by the ratio of (j−1)/j from the filter output at the low frequencies including DC. Cycle $\gamma$ control state machine 800 is cycled by a master filter control state machine from state 802 to state 804 after remaining in state 802 for j−1 cycles. This causes cycle $\gamma$ control state machine 800 to multiplex the global $\alpha$ signal to a global $\gamma$ signal. Thus if a master filter control state machine activates a global $\alpha$ signal while cycle $\gamma$ control state machine 800 is in state 804, a global $\gamma$ signal will be activated instead.

Cycle $\gamma$ control state machine 800 is then cycled by a master filter control state machine from state 804 back to state 802. This causes cycle $\gamma$ control state machine 800 to multiplex the global $\gamma$ signal to a global $\alpha$ signal. Thus, if a master filter control state machine activates a global $\alpha$ signal while cycle $\gamma$ control state machine 800 is in state 802, a global $\alpha$ signal will be activated.

Figure 9:
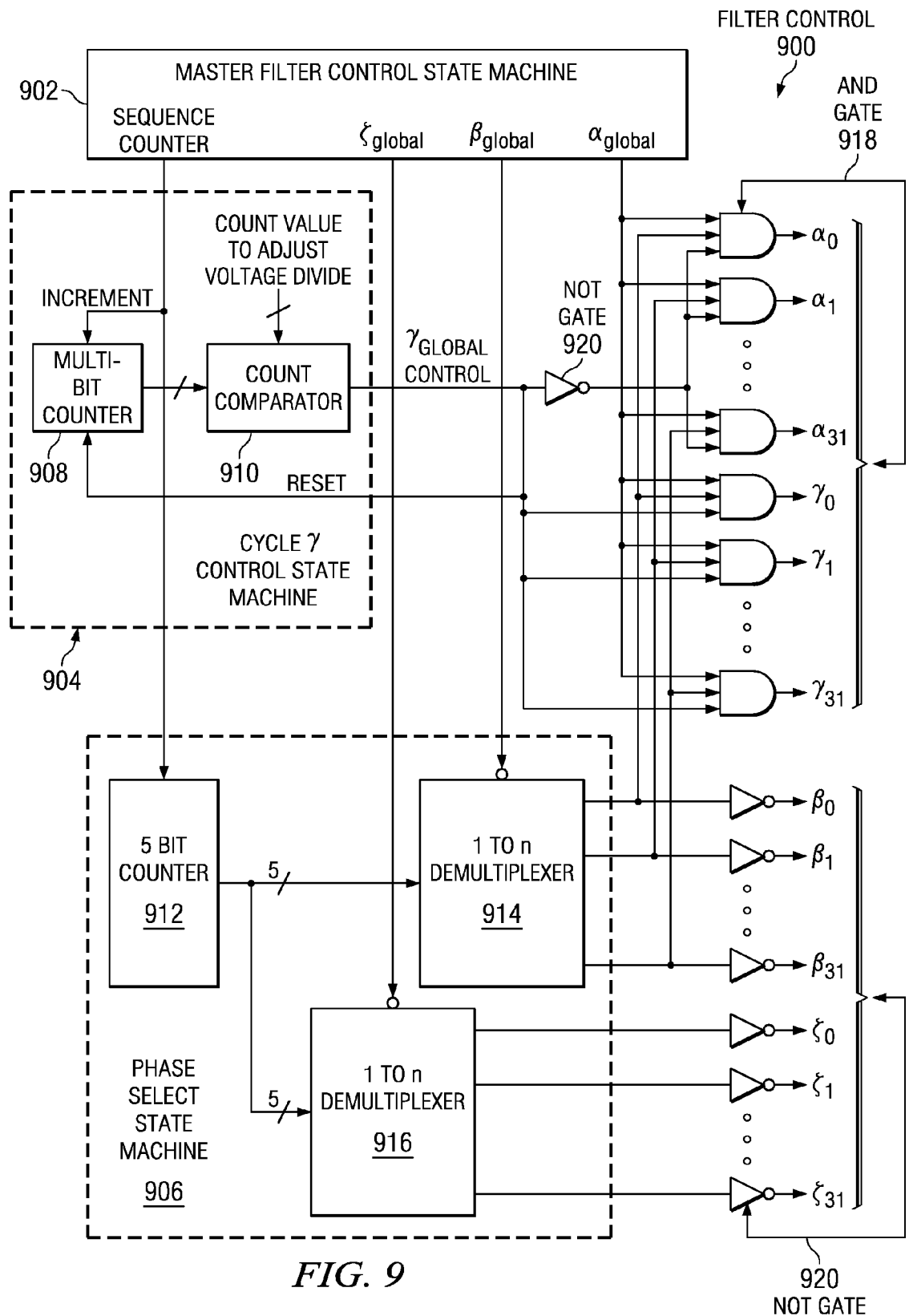
FIG. 9 is a logic diagram of a control filter in accordance with an exemplary embodiment.

FIG. 9 is a logic diagram of a control filter in accordance with an exemplary embodiment. Filter control 900 comprises the three (3) state machines of FIGS. 6, 7, and 8, interconnected to create the controls for the switched capacitor network 300 of FIG. 3. The resulting voltage droop sensing circuit has very good control over both the threshold and the voltage averaging parameters and does not require any calibration due to variances in the integrated circuit processes utilized in manufacturing this chip. This is true from variances internal to individual dies, or those across wafers.

Filter control 900 comprises master filter control state machine 902, cycle γ control state machine 904, phase select state machine 906, AND gates 918, and NOT gates 920. An AND gate is a basic logic element. An AND gate produces an output of one (1) only if all of the received inputs are one (1). A NOT gate, often referred to as a complement gate or an inverter, is a basic logic element that produces an output value that is the opposite of the input value.

Master filter control state machine 902 may be implemented as state machine 600 in FIG. 6. Phase select state machine 906 illustrates a circuit implementation that satisfies the function of phase select state machine 700 in FIG. 7. Phase select state machine 906 comprises 5-bit counter 912 and 1 to n demultiplexers 914 and 916. A demultiplexer is a logic element that decodes a control pattern to direct an input to one of many outputs. All non-selected outputs are held low. In the present exemplary embodiment, the 5 bit bus from 5 bit counter 912 to 1 to n demultiplexers 914 and 916 selects which output connected to NOT gate 920 that the inputs coming from the master filter control state machine 902 should be directed to. 1 to n demultiplexers 914 and 916 are shown with bubbles on their inputs from the master filter control state machine 902 to indicate that those inputs are inverted prior to re-driving out of the selected output of the demultiplexers. Therefore, the phase select state machine 906 will control the signal $\zeta_n$ and $\beta_n$ to the capacitor unit 302 in FIG. 3 in the switched capacitor filter 204 of FIG. 2 in sequence per timing chart 500 of FIG. 5 by direction of the $\zeta$ and $\beta$ global signal outputs of the master filter control state machine 902.

Cycle γ control state machine 904 illustrates a circuit implementation that satisfies the function of cycle γ control state machine 800 in FIG. 8. Cycle γ control state machine 904 comprises multi-bit counter 908 and count comparator 910. The master filter control state machine 902 supplies the α, β, γ, and ζ global control signals and a sequence counter to the other state machines 904 and 906 as well as to AND gates 918 per the diagram of state machine 600 in FIG. 6. Multi-bit counter 908 is large enough to count higher than the 'j' input in cycle γ control state machine 800 of FIG. 8. The output of multi-bit counter 908 is compared in count comparator 910 to a count value to adjust voltage divide input, which has a value of 'j' in FIG. 8. When multi-bit counter 908 has incremented 'j' times from the sequence counter output of the master filter control state machine 902 then the γ global control signal is asserted. The γ global control signal, when asserted, resets the multi-bit counter 908 to make the state transition from state 804 to state 802 in FIG. 8 after the γ global control signal has been asserted for one cycle.

Figure 10:
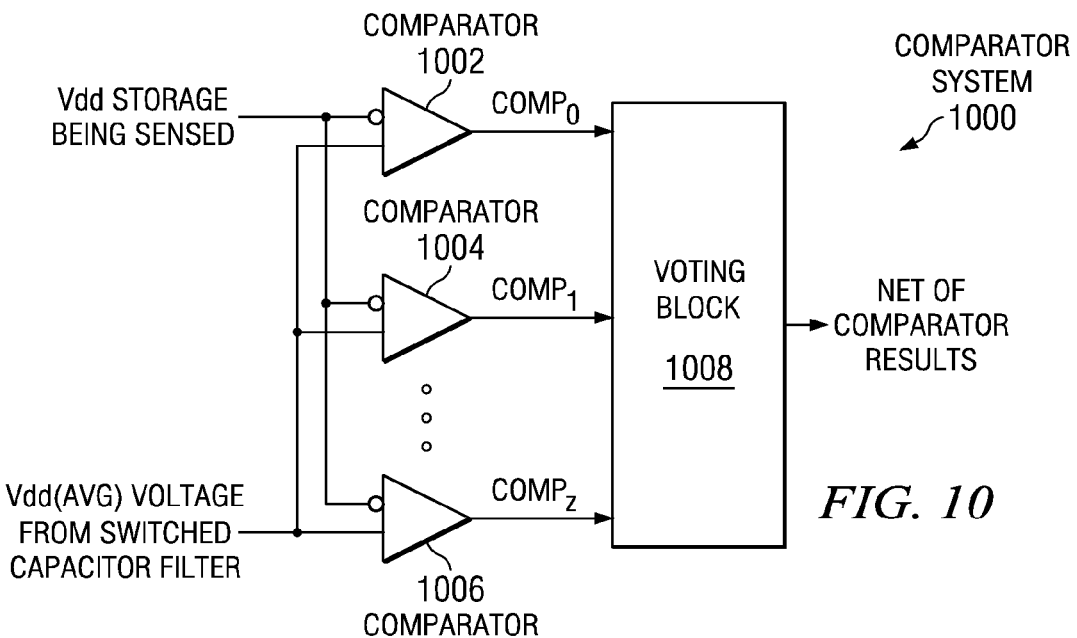
FIG. 10 is block diagram of a portion of a circuit comprising a plurality of comparators feeding into a voting block in accordance with an exemplary embodiment.

FIG. 10 is block diagram of a portion of a circuit comprising a plurality of comparators feeding into a voting block in accordance with an exemplary embodiment. In an alternate embodiment of the sensing mechanism illustrated in FIG. 2, the single comparator, comparator 206 shown in FIG. 2, is replaced with comparator system 1000, which comprises a statistically significant number of comparators, which feed a voting block to feed the latch of FIG. 2. Comparator system 1000 comprises a plurality of comparators, of which comparators 1002, 1004, and 1006 are depicted. The plurality of comparators feed into voting block 1008. In its simplest form, voting block 1008 output reflects the simple majority of the comparator inputs, which feed it. For example if there are z=9 comparators involved, then if 5 or more comparators have output high indications, then the voting block output will be high. Likewise, if 5 or more comparators have output low indications, then the voting block output will be low. The advantage of using multiple comparators and a voting block that has an output reflecting what most of the individual comparators indicate is that the offset voltage resulting from random process effects on each comparator can be statistically removed, making the accuracy of the comparison better. In addition, if there are any systematic process or design attributes which may affect offset voltage, their average effect can be minimized by various placement and/or orientations or designs of these individual comparators such that their input offset voltage is expected to be random about 0. The number z of these comparators that could be included in a given design would be dictated by the probability that the net offset voltage was within an accuracy criteria required of the droop circuitry.

Figure 11:
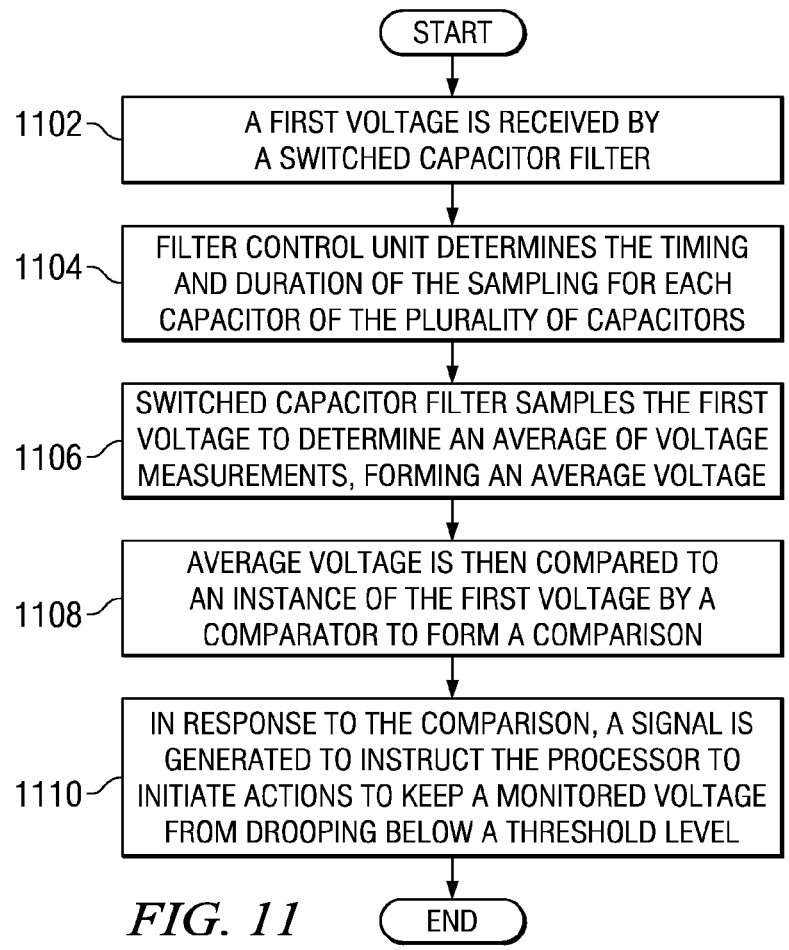
FIG. 11 is a flowchart illustrating the operation of detecting noise events in a system with time variable operating points.

FIG. 11 is a flowchart illustrating the operation of detecting noise events in a system with time variable operating points. The operation of FIG. 11 may be implemented in a circuit, such as circuit 200 in FIG. 2. The operation begins when a first voltage is received by a switched capacitor filter (step 1102). The switched capacitor filter comprises a plurality of capacitor units. The filter control unit controls the plurality of capacitors in the switched filter capacitor. The filter control unit determines the timing and duration of the sampling for each capacitor of the plurality of capacitors (step 1104). That is, the filter control unit determines which capacitor of the plurality of capacitors samples the voltage at what time and for how long. The switched capacitor filter samples the first voltage to determine an average of voltage measurements, forming an average voltage (step 1106).

The average voltage is then compared to an instance of the first voltage by a comparator to form a comparison (step 1108). In response to the comparison, a signal is generated to instruct the processor to initiate actions to keep the first voltage from drooping below a threshold level (step 1110) and the operation ends.

Thus, exemplary embodiments utilize switched capacitor technology in a novel manner in order to obtain very accurate criteria for averaging period and droop threshold level without requiring any calibration processes to mitigate process tolerances on the circuit elements. Furthermore, exemplary embodiments do not impose any variations in normal integrated circuit manufacturing processes.

Those skilled in the art may recognize that these functions described above may be accomplished via other means such as logic sequencers, random logic macros, asynchronous state machine logic, etc. The parameter values, including representative numbers of capacitor unit 400, bandwidth, etc. referenced in the description above can be increased or decreased to meet the needs of the applications according to the principles described herein. Those skilled in the art will recognize that additional transistors or switches with controls incorporated in and around the basic comparator unit 206 do not alter the basic function of the circuits, but may provide additional mechanisms to manage noise. The description above has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Another exemplary embodiment of the present invention provides for sensing the Vdd voltage with sample and hold circuitry such that the samples were taken at the same point in the processor clock cycle period so that the high frequency ripple may be filtered out at frequency.

This circuit may be replicated around each of the execution units in a microprocessor and may operate either in sync, or independently from similar circuits placed throughout the microprocessor. The execution stall can be done on a per unit basis if need be, and indeed may be an exemplary embodiment since the spatial separation of units may result in some electrical isolation as well.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A circuit for detecting noise events in a system with time variable operating points, said circuit comprising:
    a switched capacitor filter comprising a plurality of capacitor units for sampling a first voltage to determine an average of a set of voltage measurements, forming an average voltage;
    a filter control unit for controlling the plurality of capacitor units in the switched capacitor filter;
    a comparing unit for comparing the average voltage to the first voltage to form a comparison; and
    a signaling unit for generating a signal to instruct circuits in a processor to initiate actions to keep the first voltage from drooping below a threshold level in response to the comparison.

2. The circuit of claim 1, wherein the comparing unit comprises a plurality of comparators and a voting block.

3. The circuit of claim 1, wherein the filter control unit comprises:
    a master filter control state machine;
    a phase select state machine;
    a cycle discharging control signal state machine;
    a plurality of AND gates; and
    a plurality of NOT gates.

4. The circuit of claim 3, wherein the cycle discharging control signal state machine determines that a discharging control signal rather than a charging control signal should be activated when a master filter control state machine activates a global charging control signal.

5. The circuit of claim 4, wherein the cycle discharging control signal state machine is cycled between a first state and a second state by the master filter control state machine.

6. The circuit of claim 5, wherein the first state indicates that a discharging control signal should be activated when the master filter control state machine activates the global charging control signal.

7. The circuit of claim 5, wherein the second state indicates that a charging control signal should be activated when the master filter control state machine activates the global charging control signal.

8. The circuit of claim 3, wherein the phase select state machine determines which capacitor unit of the plurality of capacitor units samples the first voltage during a sampling period.

9. The circuit of claim 8, wherein a capacitor unit of the plurality of capacitor units samples the first voltage during a sampling period when a charging control signal input of the capacitor unit is in an on state and a strong switch charge averaging control signal input of the capacitor unit is in an off state.

10. The circuit of claim 8, wherein a default setting of a charging control signal input state and a strong switch charge averaging control signal input state for each capacitor unit of the plurality capacitor units is the charging control input state set to off and the strong switch charge averaging control signal input state set to on.

11. The circuit of claim 3, wherein the master filter control state machine determines the sample rate of the switched capacitor filter.

12. The circuit of claim 11, wherein the master filter control state machine is configured by a first parameter to control a time delay between activations of a charging control signal, a discharging control signal, a strong switch charge averaging control signal, a weak switch charge averaging control signal and wherein the master filter control state machine is configured by a second parameter to control a delay between activating the strong switch charge averaging control signal and the weak switch charge averaging control signal.

13. The circuit of claim 12, wherein the second parameter is set to assure that the weak switch charge averaging control signal is activated for a period of time that allows the plurality of capacitor units to be at about the same voltage before activating the strong switch charge averaging control signal.

14. The circuit of claim 11, wherein the master filter phase control machine determines when the phase select state machine and the cycle discharging control signal state machine change states.

15. The circuit of claim 1, wherein the signal is generated in response to the first voltage being lower than the average voltage by a specified criteria.

16. The circuit of claim 1, wherein the signal is generated in response to the first voltage being higher than the average voltage by a second specified criteria.

17. The circuit of claim 1, wherein each capacitor unit of the plurality of capacitor units comprises:
    a first transistor;
    a second transistor;
    a third transistor;
    a fourth transistor; and
    a capacitor.

18. The circuit of claim 17, wherein the first transistor is controlled by a charging control signal from the filter control unit;
    wherein the second transistor is controlled by a strong switch charge averaging control signal from the filter control unit;
    wherein the third transistor is controlled by a discharging control signal from the filter control unit; and wherein the fourth transistor is controlled by a weak switch charge averaging control signal from the filter control unit.

19. The circuit of claim 1, wherein the plurality of capacitor units comprises thirty-two capacitor units.

20. A method for detecting circuit noise events in a system with time variable operating points, said method comprising:
   sampling a first voltage by a plurality of capacitor units to determine an average of a set of voltage measurements, forming an average voltage;
   comparing the average voltage to the first voltage to form a comparison; and
   generating a signal to instruct circuits in a processor to initiate actions to keep the first voltage from drooping below a threshold level in response to the comparison.

21. The method of claim 20, wherein comparing the average voltage to the first voltage to form a comparison comprises:
   comparing the average voltage to the first voltage by a plurality of comparators; and
   summarizing results of the comparators by a voting block to form a comparison.

22. The method of claim 20, further comprises:
controlling a timing for sampling the first voltage for each capacitor unit in the plurality of capacitor units; and
controlling a duration for sampling the first voltage for each capacitor unit in the plurality of capacitor units.

23. The method of claim 22, further comprising:
configuring a first parameter to control a time delay between activations of a charging control signal, a discharging control signal, a strong switch charge averaging control signal, and a weak switch charge averaging control signal.

24. The method of claim 23, further comprising:
configuring a second parameter to control a delay between activating the strong switch charge averaging control signal and the weak switch charge averaging control signal.

25. The method of claim 23, further comprising:
determining whether a discharging control signal or a charging control signal should be activated when a signal to activate a global charging control signal is received.

* * * * *